US010360741B2

(12) United States Patent
Huet et al.

(10) Patent No.: US 10,360,741 B2
(45) Date of Patent: Jul. 23, 2019

(54) PREDICTING FAILURES IN AN AIRCRAFT

(71) Applicants: AIRBUS OPERATIONS (S.A.S.), Toulouse (FR); AIRBUS (S.A.S.), Blagnac (FR)

(72) Inventors: Jean-Max Huet, Launaguet (FR); Franck Duluc, Blagnac (FR); Eric Benhamou, Aurade (FR); Bruno Maillard, Tournefeuille (FR)

(73) Assignees: Airbus Operations (S.A.S), Toulouse (FR); Airbus (S.A.S.), Blagnac (FR)

( * ) Notice: Subject to any disclaimer, the term of this patent is extended or adjusted under 35 U.S.C. 154(b) by 32 days.

(21) Appl. No.: 15/606,917

(22) Filed: May 26, 2017

(65) Prior Publication Data
US 2017/0352204 A1 Dec. 7, 2017

(30) Foreign Application Priority Data

Jun. 2, 2016 (FR) ...................... 16 55040

(51) Int. Cl.
*G07C 5/08* (2006.01)
*B64D 45/00* (2006.01)
*G06N 5/04* (2006.01)
*G06N 99/00* (2019.01)
*G06N 20/00* (2019.01)
*G06F 11/00* (2006.01)
*G05B 23/02* (2006.01)

(52) U.S. Cl.
CPC .......... *G07C 5/0808* (2013.01); *B64D 45/00* (2013.01); *G05B 23/0221* (2013.01); *G06F 11/008* (2013.01); *G06N 5/04* (2013.01); *G06N 20/00* (2019.01)

(58) Field of Classification Search
CPC .... G05B 23/0283; B64D 45/00; G06N 20/00; G06N 5/04; G07C 5/0808; G06F 11/008
See application file for complete search history.

(56) References Cited

U.S. PATENT DOCUMENTS 8,682,616 B2    3/2014  Lacaille
2009/0228409 A1*  9/2009  Eklund .................. G06F 11/008
                                                706/12

(Continued)

FOREIGN PATENT DOCUMENTS

FR    2939924 A1    6/2010
FR    2999318 A1    6/2014
GB    2510253 A    7/2014

OTHER PUBLICATIONS

French Search Report for Application No. 1655040 dated Jan. 13, 2017.

*Primary Examiner* — Mussa A Shaawat
(74) *Attorney, Agent, or Firm* — Jenkins, Wilson, Taylor & Hunt, P.A.

(57) ABSTRACT

The disclosure herein proposes identifying precursors to all the phenomena which can have an impact on the service use of an aircraft. It relates to a system for predicting failures in an aircraft, including a processor configured to analyze a current behavior of at least one flight parameter of the aircraft to detect any deviation of the current behavior relative to a predetermined behavior model of the parameter, the behavior model being determined from a plurality of series of learning data relating to the parameter collected during the flights of a set of aircraft.

19 Claims, 5 Drawing Sheets

(56) References Cited

U.S. PATENT DOCUMENTS

| | | | |
|---|---|---|---|
| 2009/0249129 A1 | 10/2009 | Femia | |
| 2009/0254240 A1 | 10/2009 | Olsen, III et al. | |
| 2011/0040470 A1* | 2/2011 | Qiu | F01D 19/00 |
| | | | 701/100 |
| 2011/0172874 A1 | 7/2011 | Patnaik et al. | |
| 2014/0288764 A1* | 9/2014 | Catt | B64C 9/20 |
| | | | 701/31.9 |
| 2014/0309846 A1* | 10/2014 | Howard | B64F 5/0045 |
| | | | 701/31.9 |
| 2015/0096359 A1* | 4/2015 | Catt | G07C 5/008 |
| | | | 73/112.01 |
| 2016/0063434 A1* | 3/2016 | Kim | G06Q 10/0833 |
| | | | 705/333 |
| 2016/0102994 A1* | 4/2016 | Brenner | G05D 1/0077 |
| | | | 701/7 |
| 2016/0125053 A1* | 5/2016 | Willson | G06F 17/30569 |
| | | | 707/746 |
| 2016/0257429 A1* | 9/2016 | Szeto | G07C 5/008 |
| 2017/0052836 A1* | 2/2017 | Horabin | G05B 23/0235 |
| 2017/0061295 A1* | 3/2017 | Horabin | G06N 5/04 |
| 2017/0261406 A1* | 9/2017 | Dion | G01M 99/008 |
| 2017/0264362 A1* | 9/2017 | Torres | H04B 10/071 |
| 2017/0293517 A1* | 10/2017 | Dion | G06F 11/0721 |

\* cited by examiner

PREDICTING FAILURES IN AN AIRCRAFT

CROSS-REFERENCE TO RELATED APPLICATION

This application claims the benefit of and priority to French patent application number FR 16 55040 filed on Jun. 2, 2016, the entire disclosure of which is incorporated by reference herein.

TECHNICAL FIELD

The present disclosure relates to the field of detecting early signs of failures in an aircraft. In particular, the disclosure herein relates to a method and a system for predicting failures to anticipate the maintenance operations of an aircraft.

BACKGROUND

Each aircraft comprises a system for detecting failures BITE (built-in test equipment) to detect and isolate any failing equipment. Furthermore, the critical flight controls are monitored by a monitoring system FWS (flight warning system) which signals any failure or anomaly to the crew. The alert transmitted before the flight by the FWS indicates the impact of an event on serviceability of the aircraft allowing the crew to determine the service status of the aircraft.

The data transmitted by the BITE and FWS systems are acquired and processed by the centralized supervision system CMS (central maintenance system) of the various components of the aircraft.

The functions of the centralized supervision system CMS are hosted on two identical computers. The CMS aggregates and processes data on anomalies from a chain of different components in order to generate the diagnosis of the anomaly.

The results of the various diagnostics performed by the CMS are saved in an embedded database and are also displayed on an onboard interface via control and display units MCDU (multipurpose control and display units).

Furthermore, alert or anomaly messages are transmitted to the ground stations via a message system called ACARS (aircraft communication addressing and reporting system) to be processed in the case of obvious anomalies and, otherwise, to be archived in databases. These messages are transmitted to the ground in the form of reports during the flight CFR (current flight report) or at the end of flight PFR (post flight report).

The monitoring system CMS thus supplies information useful to maintenance and to the pilots to know whether an aircraft can be used in total safety or if the aircraft must be blocked in order to perform maintenance before placing it in service.

This monitoring system is very effective and provides a maximum level of safety to the aircraft. However, in some cases, pilots may be taken short by an unexpected failure alert before the flight that can lead to delays or even flight cancellations.

Moreover, the monitoring system is based on rules predefined in advance to detect the failures. However, there may be phenomena that are not currently suspected and which may possibly have an impact.

An object of the present disclosure is consequently to a method and a system for identifying precursors to all the phenomena which can have an impact on the serviceability of an aircraft thus making it possible to schedule the maintenance operations long in advance in order to avoid flight delay or cancellation problems.

SUMMARY

The present disclosure relates to a method for predicting failures in an aircraft, comprising an analysis of a current behavior of at least one flight parameter of the aircraft to detect any deviation of the current behavior relative to a preconstructed behavior model of the parameter, the behavior model being constructed in a preliminary learning phase from a plurality of series of learning data relating to the parameter collected during the flights of a set of aircraft.

This makes it possible to identify very early precursors of failures, thus making it possible to not be taken short by an unexpected failure and, consequently, to anticipate maintenance and to make schedulings long in advance while ensuring optimal availability of the aircraft without flight delays. Furthermore, this method makes it possible to detect, without preconception, atypical behavior or early signs of unsuspected failure which can have an impact on the availability of the aircraft.

According to an embodiment of the disclosure herein, the detection of any deviation of behavior of a flight parameter comprises:

collecting, on each current flight, a current series of data from measurements relating to the parameter;

segmenting the current series of data into a predetermined number of segments to transform it into a current string of segments, the number of segments being defined by the behavior model;

aligning the segments of the current string of segments relative to a reference string of segments defined by the behavior model;

assigning predetermined characteristic measurements to the current string of segments to generate a current measurement vector; and computing a distance between the current measurement vector and a reference measurement vector defined by the behavior model, the value of the distance being representative of a normal or deviant behavior of the flight parameter.

This makes it possible to estimate the probability of occurrence of failure with great accuracy.

Advantageously, the method further comprises the computation of or computing a score of abnormal behavior of the flight parameter.

This makes it possible to characterize the level of degradation and to estimate the delay between the detection of early signs of failure and the actual occurrence of the failure.

Advantageously, the method further comprises an identification of a set of flights of the aircraft exhibiting a deviant behavior and of the maintenance actions performed during the set of flights.

This makes it possible to accurately schedule future maintenance in order to well manage the return of the aircraft to service.

Advantageously, each series of learning data or current series of data comprises temporal data from a flight data recorder and/or temporally indexed failure messages from a centralized supervision system.

This makes it possible to have several sources of information, increasing the accuracy of the detection of early signs of failures.

According to an embodiment of the present disclosure, the construction of the behavior model relating to a given parameter comprises:
collecting, on each of the flights of the set of the aircraft, at least one series of learning data from measurements relating to the parameter thus forming, during the flights of the set of the aircraft, the plurality of series of learning data;
segmenting each series of learning data into an optimal number of segments to transform it into a string of learning segments, the optimal number of segments defining the predetermined number of segments associated with the parameter;
transforming the set of series of learning data into a corresponding set of strings of learning segments;
selecting a central string of segments from the set of strings of learning segments, the central string of segments defining the reference string of segments;
aligning the segments of the set of strings of learning segments by being identified relative to the reference string of segments;
generating a learning measurement vector for each string of learning segments by assigning predetermined characteristic measurements to each learning segment and/or to the set of segments of each string of learning segments;
computing a learning distance between each learning measurement vector and a reference measurement vector associated with the reference string of segments; and
partitioning the set of the learning measurement vectors according to consecutive intervals as a function of the learning distances thus defining a normal behavior interval and atypical behavior intervals.

This makes it possible to use a large volume of information to generate a behavior model that is accurate, reliable, robust and easy to use to reveal any atypical behavior of a parameter relating to a new flight and consequently makes it possible to analyze the causes of the atypical behavior and prevent future failures.

Advantageously, the central string of segments corresponds to the medoid of the set of strings of segments.

Advantageously, the method further comprises:
saving the reference string of segments, the distances between the measurement vectors and the reference measurement vector and the partitioning of the measurement vectors;
displaying a graph representative of the behavior model.

The disclosure herein also targets a system for predicting failures in an aircraft, comprising a processor configured to analyze a current behavior of at least one flight parameter of the aircraft to detect any deviation of the current behavior relative to a predetermined behavior model (for example, a theoretical model) of the parameter, the behavior model being determined from a plurality of series of learning data relating to the parameter collected during flights of a set of aircraft.

The disclosure herein also targets a monitoring system comprising maintenance and management avionics systems and the system for predicting failures according to the above features.

This makes it possible to accurately schedule maintenance very early in order to well manage the return of the aircraft to service.

BRIEF DESCRIPTION OF THE DRAWINGS

Other particular features and advantages of the device and of the method according to the disclosure herein will become more apparent on reading the following description, given in an indicative but nonlimiting manner, with reference to the attached example drawings, in which.

DETAILED DESCRIPTION

The principle of the disclosure herein relates to best exploiting the history of behavior of parameters from a very large number of flights of a plurality of aircraft in order to detect, automatically and without preconception, early signs of failure on an aircraft.

Figure 1:
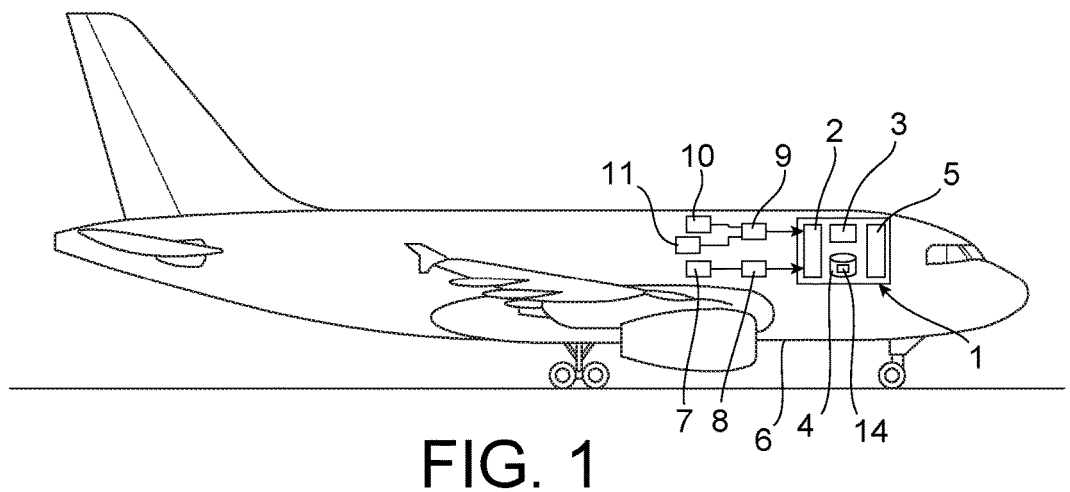
FIG. 1 schematically illustrates a system for predicting failures in an aircraft, according to an embodiment of the disclosure herein.

FIG. 1 schematically illustrates a system for predicting failures in an aircraft, according to an embodiment of the disclosure herein.

The system for predicting failures 1 comprises a data acquisition module 2, a processor 3, storage units 4 and an input and output interface 5.

The acquisition module 2 is configured to recover data from measurements relating to flight parameters of the aircraft 6.

In effect, during each flight, the aircraft 6 proceeds to record information on different avionics parameters. An acquisition system 7 centralizes and formats all the data from the different sensors, embedded computers, or other instruments, and transfers them to flight data recorders 8 (FDR) via dedicated links. The data can be discrete (for example, logic detection states, indicators, states of switches or relays, etc.), analog (for example potentiometer data), or synchronization data, etc.

Furthermore, a centralized supervision system 9 (CMS) processes the data transmitted by the system for detecting failures 10 (BITE) and monitoring system 11 (FWS) and generates reports or failure messages.

Thus, the acquisition module 2 is configured to recover the ordered data (generally temporally indexed) relating to the flight parameters from at least one flight data recorder 8 and/or failure messages indexed in an ordered manner from the centralized supervision system 9 (CMS).

The processor 3 is configured to analyze the behavior of at least one flight parameter of the aircraft 6 to detect any deviation of behavior of the parameter relative to a reference behavior model 14 preconstructed and saved in the storage units 4.

Moreover, the interface 5 is configured to display the results of the analysis illustrating any behavior deviation of each parameter relative to each corresponding behavior model 14.

Furthermore, the storage units 4 are configured to save the data acquired during the flight, the results of the analysis and the reference behavior model 14.

It will be noted that the behavior model 14 of a parameter is constructed in a preliminary learning phase from a plurality of series of learning data relating to the parameter collected during the flights of a plurality of aircraft. A series of data should be understood to mean data exhibiting an ordered indexing of temporal type.

The present disclosure thus proposes analyzing data ordered globally and/or locally according to different perspectives in order to detect data which are significantly different from a set of other data labelled as being normal.

Figure 2:
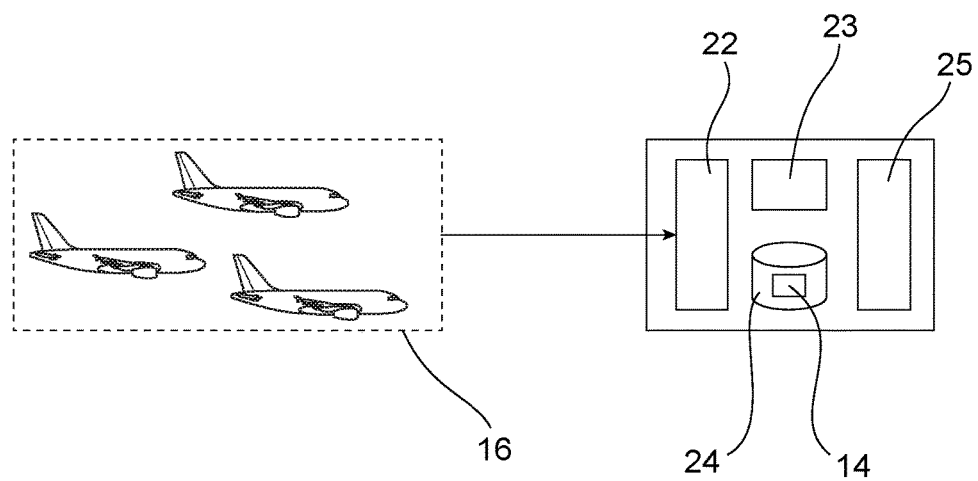
FIGS. 2 and 3 schematically illustrate a construction of a behavior model, according to an embodiment of the disclosure herein.

FIG. 2 schematically illustrates a system for constructing the behavior model, according to an embodiment of the disclosure herein.

Figure 3:
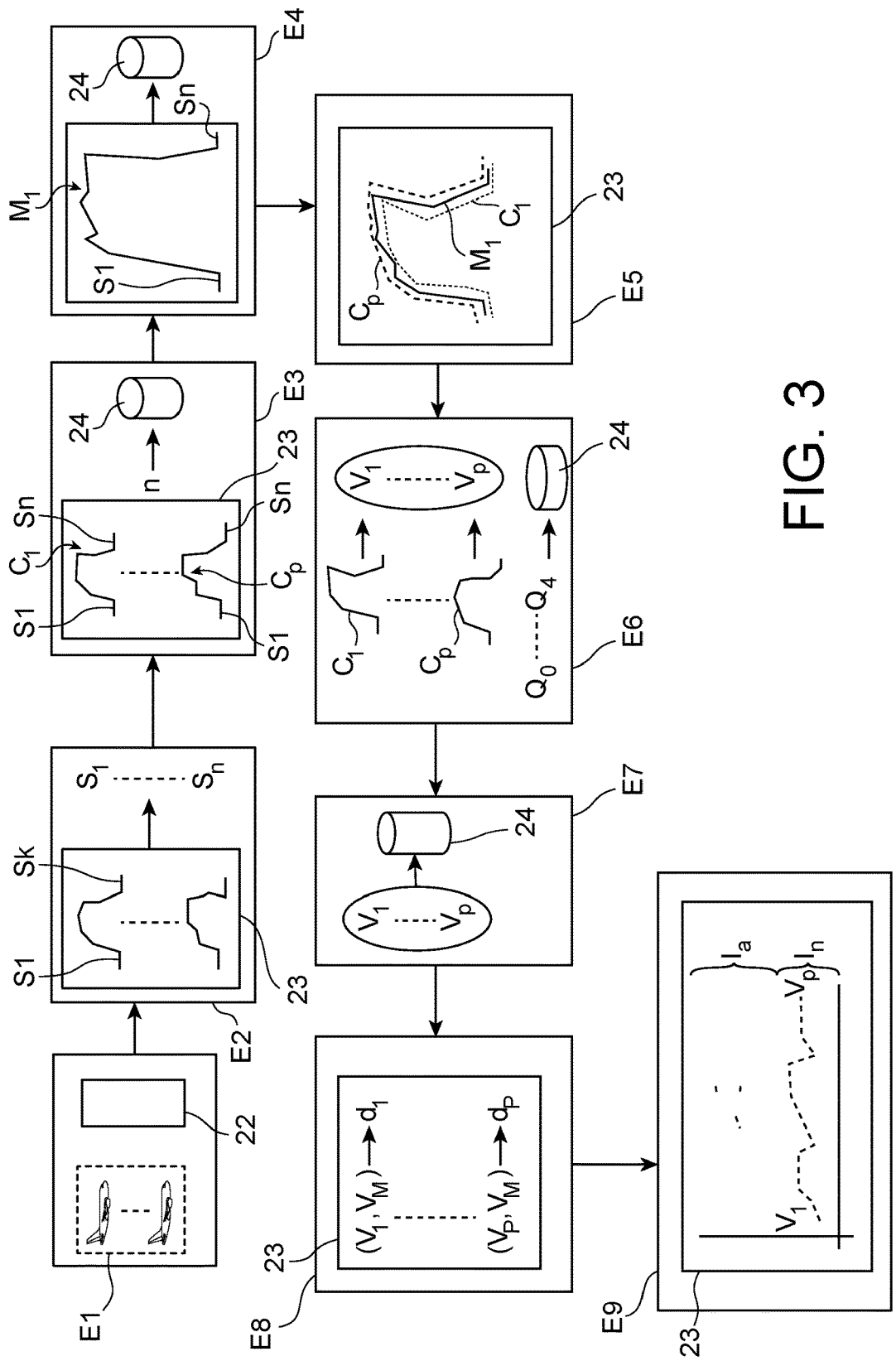

Furthermore, FIG. 3 illustrates, in relation to FIG. 2, a method for constructing the behavior model associated with a parameter, according to an embodiment of the disclosure herein.

The construction of the behavior model 14 consists in or comprises selecting, for each given parameter, a group of flights of a set of aircraft 16 having a normal behavior (at least with respect to the parameter) and in recording their ordered data in order to extract specific characteristics making it possible to generate the behavior model 14. This model 14, once constructed, can then be used for each new flight in order to determine whether the parameter associated with the new flight exhibits an abnormal behavior relative to the behavior model 14.

In a way similar to the system for predicting failures 1, the system for constructing 21 the behavior model 14 comprises a learning acquisition model 22, a learning processor 23, learning storage units 24 and a learning interface 25.

Hereinbelow, the construction of a behavior model 14 associated with a specific parameter will be explained but, of course, the method is the same for the construction of each of the flight parameters.

In the step E1, the learning acquisition module 22 is configured to collect, on each of the flights of the set of the aircraft 16, at least one series of learning data from measurements relating to the parameter. Thus, during the flights of the set of the aircraft 16, the learning acquisition module 22 collects a plurality of series of learning data.

Each series of learning data comprises temporal data from a flight data recorder of a corresponding aircraft and/or temporally indexed failure messages from the centralized supervision system of the corresponding aircraft.

It will be noted that each flight can have a different duration, a different trajectory and different flight phases from other flights. Thus, the ordered data from the different flights do not necessarily have the same lengths or the same characteristics at the same moments, consequently complicating the comparison between these different data.

Furthermore, the data from flights of a large population of aircrafts 16 represents an enormous mass of information which cannot be analyzed directly.

In effect, in the step E2 and in order to reduce the dimension of the data, the learning processor 23 is configured to segment each series of learning data into an optimal number of segments s1 . . . sk exhibiting a good approximation of the starting series of data.

Advantageously, the learning processor 23 is first of all configured to compute, for each flight independently, a minimum number of segments associated with the parameter. The minimum number of segments for each flight is computed according to an iterative process by setting, at the outset, an initial number of segments and by analyzing the convergence of the segments toward the series of data on each iteration. As an example, the convergence criterion corresponds to a minimum deviation between the curve formed by the series of data and that formed by the segments. This deviation can be determined by quite simply computing the area between the two curves.

In order to verify that the minimum number of segments has been reached, it is possible to apply a non-positive gain strategy which consists in or comprises eliminating the segments which do not add (or add very little) additional accuracy to the convergence.

Once a minimum number of segments is computed for each flight, the learning processor 23 is configured to analyze the distribution of all the minimum numbers of segments of the different flights in order to determine a single optimum number n of segments s1 . . . sn acceptable for all the flights. In other words, for a given parameter, the learning processor 23 computes a single optimum number of segments n (that will be called hereinbelow predetermined number of segments) valid for all the flights of all the aircraft 16. Each predetermined number n of segments associated with each parameter is saved in the learning storage units 14 to be able to be used in the detection of early signs of failures on each new flight.

Thus, the segmentation transforms each series of learning data into a curve made up of a string of learning segments, each segment being defined only by two points which can additionally be shared by the neighboring segments. For example, if a series of data indexed by 3000 points is subdivided into six segments, there is then obtained a subseries of only 7 points instead of 3000.

In the step E3, the learning processor 23 is configured to use the single predetermined number n (i.e. the optimum number) of segments associated with a given parameter to once again segment each series of learning data.

Thus, the learning processor 23 transforms each set of series of learning data into a corresponding set of strings of learning segments c1 . . . cp which is then saved in the learning storage units 24.

In the step E4, the learning processor 23 is configured to select a central string of segments M1 from the set of strings of learning segments determined in the preceding step.

Advantageously, the central string of segments M1 is determined by computing the medoid of the set of strings of learning segments. The medoid is a string of segments belonging to the set of strings of segments and which represents a minimum similarity deviation with all the other strings of segments. It corresponds more or less to the median string of segments of the set of strings of segments. The central string of segments M1, which will hereinafter be called reference string of segments M1, thus defines a reference relative to which the other strings of segments are aligned. This reference string of segments M1 is saved in the learning storage units 24 to be able to be used in the detection of early signs of failures on each new flight.

In effect, in the step E5, the learning processor 23 is configured to align the segments of the set of strings of learning segments c1 . . . cp by taking as alignment reference, the reference string of segments M1. The latter acts as a model for the set of strings of segments c1 . . . cp.

As an example, the learning processor 23 is configured to apply a dynamic time-warping algorithm DTW relative to the reference string of segments M1 (DTW-Medoid).

The alignment facilitates the task of comparison between the different segments. It will moreover be noted that the alignment can possibly modify the initial segmentation of the series of learning data.

However, certain characteristics of the initial data can be lost by the segmentation. Then, in order to recover a part of this lost information, metrics extracted from the initial ordered data are assigned to each segment or to each string of learning segments c1 . . . cp.

In effect, in the step E6, the learning processor 23 is configured to generate a learning measurement vector V1 . . . Vp for each string of learning segments c1 . . . cp by assigning individually predetermined characteristic measurements to each learning segment and/or globally to the set of segments of each string of learning segments. The predetermined characteristic measurements comprise, for example, measurements of slopes, of means, of variances, of standard deviations, of minima, of maxima, of angular speeds, of frequency parameters, etc.

The learning measurement vectors V1 . . . Vp can be considered as multivariate chronological series increasing a little the dimension of the strings of learning segments. It will be noted that each learning measurement vector V1 . . . Vp associated with a given parameter represents a flight.

This step (step E6) then corresponds to a meta-segmentation process consisting in or comprising computing, on each flight, a few explanatory variables locally (i.e. by segment) or globally (i.e. for all of the string of segments). Each variable adds a new dimension which makes it possible to increase the accuracy of construction of the behavior model 14.

Advantageously, for each flight and each parameter, the learning processor 23 is configured to compute percentiles $Q_0$, $Q_1$, $Q_2$, $Q_3$, $Q_4$ on the learning measurement vectors bearing in mind that the normal behavior is defined in the interval $[Q_0, Q_4]$. The percentile values are saved in the learning storage units 24.

Advantageously, in the step E7, the learning processor 23 is configured to normalize the learning measurement vectors associated with the set of strings of learning segments c1 . . . cp. The normalized learning measurement vectors are saved in the learning storage units 24.

In the step E8, the learning processor 23 is configured to compute a learning distance d1 . . . dp between each learning measurement vector V1 . . . Vp (possibly normalized) and a reference measurement vector Vm associated with the reference string of segments M1.

Advantageously, the learning processor 23 uses a Euclidean distance measurement. As a variant, in the case where the measurement vectors are linearly independent, it is possible to use a distance of Mahalanobis type which then takes into account the correlation between the different vectors. The learning distances (Euclidean and/or Mahalanobis) are saved in the learning storage units.

In the step E9, the learning processor 23 is configured to partition the set of the learning measurement vectors according to consecutive intervals as a function of the learning distances. This partitioning defines a normal behavior interval In and one or more atypical behavior interval(s) Ia.

Advantageously, it is possible to use the percentiles $Q_0$, $Q_1$, $Q_2$, $Q_3$, $Q_4$ computed previously on the measurement vectors associated with the set of strings of segments to define the normal behavior interval, bearing in mind that outside of this interval, the behavior will be considered as abnormal.

Thus, all the analyses and data (reference string of segments M1, distances between the measurement vectors d1 . . . dp, reference measurement vector Vm, the partitioning of the measurement vectors) saved in the learning storage units 24 constitute a behavior model 14 that is accurate, reliable and robust.

Advantageously, a graph representative of the behavior model is displayed on the learning interface 25.

Figure 4:
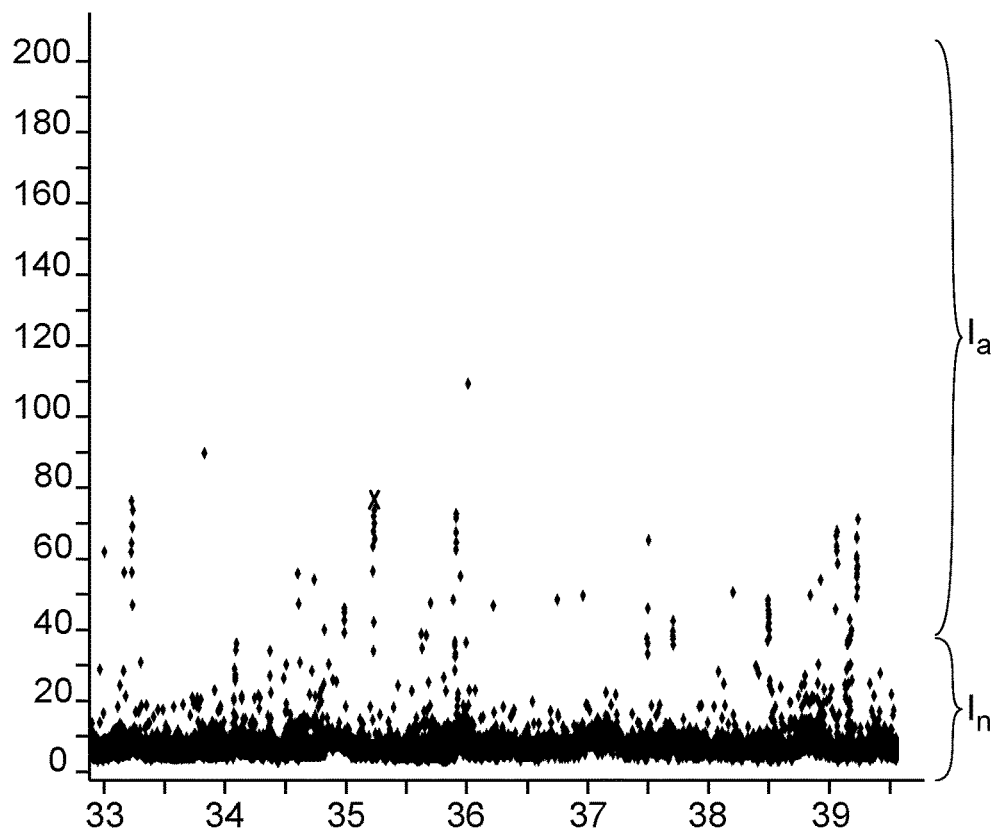
FIG. 4 illustrates a display of a graph representative of the behavior model associated with a given parameter, according to an embodiment of the disclosure herein.

In effect, FIG. 4 illustrates a display of a graph representative of the behavior model associated with a given parameter, according to an embodiment of the disclosure herein.

This graph represents the different learning flights and their distances relative to a reference flight. Each flight is represented by a point corresponding to a learning measurement vector. The x axis indicates the dates of the different flights and the y axis indicates the distance of each flight relative to the reference flight. The y axis is divided into two intervals In, Ia: the first In defining a population of flights having a normal behavior for the parameter concerned and the second Ia defining the flights having an atypical behavior. This graph thus illustrates the positioning of each flight relative to the others and above all relative to the population of normal flights. The more distant a flight is from the normal population, the more its behavior is judged abnormal.

It will also be noted that this graph is divided into several columns (distinguished by vertical lines) representing several corresponding aircraft. According to this example, there are eight columns representing eight aircraft and each column indicates the successive flights of each corresponding aircraft. In effect, the flights of each aircraft are ordered in time on the x axis within the corresponding column.

This graph thus makes it possible to very simply reveal any atypical behavior of a parameter relating to a new flight relative to the normal flights and consequently makes it possible to analyze the causes of the atypical behavior and above all prevent future failures.

Advantageously, before performing tests for new flights, the learning processor 23 is configured to perform statistical analyses on the different learning flights on the basis of the dispersion of the percentiles $Q_0$, $Q_1$, $Q_2$, $Q_3$, $Q_4$. The points judged aberrant corresponding to the flights which have very atypical behaviors relative to the majority of the other flights are eliminated while avoiding eliminating extreme but valid flights.

Figure 5:
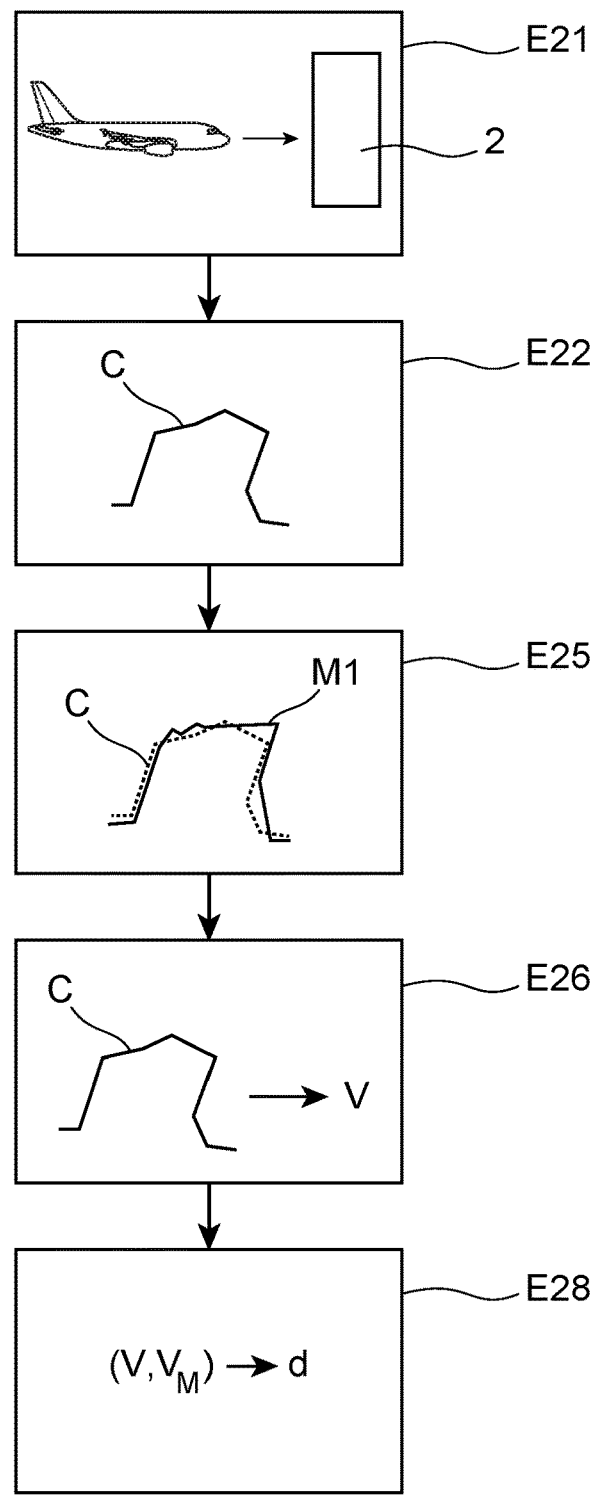
FIG. 5 illustrates a method for predicting failures in an aircraft in relation to the system of FIG. 1, according to a preferred embodiment of the disclosure herein.

FIG. 5 illustrates a method for predicting failures in an aircraft in relation to the system of FIG. 1, according to a preferred embodiment of the disclosure herein.

The method for predicting failures comprises steps similar to the method for constructing the behavior model. However, the method for predicting failures applies the behavior model 14 to the data of a new flight to detect any deviation of behavior of a flight parameter relative to the normal flights of the behavior model 14. Hereinbelow, the method for predicting failures is explained for a given parameter but, of course, the method is applicable for each flight parameter.

Initially, the behavior model 14 (comprising the predetermined number of segments, the reference string of segments, the predetermined characteristic measurements, etc.) is saved in the storage units 4.

In the step E21, the acquisition module 2 is configured to collect, on each current flight, a current series of data from measurements relating to the corresponding parameter.

Each current series of data comprises temporal data from a flight data recorder 8 of the aircraft and/or temporally indexed failure messages from a centralized supervision system 9 of the aircraft.

In the step E22, the processor 3 is configured to segment the current series of data according to the predetermined number of segments defined by the behavior model 14. This segmentation transforms the current series of data into a curve or current string of segments S.

In the step E25, the processor 3 is configured to align the segments of the current string of segments C (for example by applying the DTW technique) relative to the reference string of segments M1. It will be recalled that the latter has been defined in the construction of the behavior model 14 and serves as reference for the alignment of the segments.

In the step E26, the processor is configured to assign predetermined characteristic or explanatory measurements to the current string of segments C to generate a current measurement vector V. The predetermined characteristic measurements are the same as those which were used to construct the behavior model 14. The characteristic measurements (slope, mean, variance, standard deviation, minimum, maximum, angular speed, frequency) are assigned to each segment and/or to the set of segments of the current string of segments.

In the step E28, the processor 3 is configured to compute a distance d (Euclidean and/or Mahalanobis) between the current measurement vector V and the reference measurement vector Vm defined by the behavior model. The value of this distance is representative of a normal or abnormal behavior of the flight parameter.

The value of the distance d between the current measurement vector V and the reference measurement vector Vm makes it possible to represent the current flight by a point on the graph representative of the behavior model 14 which can be displayed on the interface 5.

Advantageously, the processor 3 is configured to compute a score of abnormal behavior of the flight parameter.

In effect, by using the percentiles $Q_0$, $Q_1$, $Q_2$, $Q_3$, $Q_4$, the processor 3 computes the score K of a parameter of a flight represented by a point v according to the following algorithm:

$K=0$ for $v<Q_0$ then $K=(v-Q_1)/(Q_3-Q_1)$ or else if $v>Q_4$ then $K=(v-Q_3)/(Q_3-Q_1)$.

The score K makes is possible to quantify the anomaly level and, consequently, to estimate the delay between the detection of the anomaly and the actual occurrence of the failure. The higher the value of the score K, the more significant the anomaly.

Advantageously, different graphs can be used to represent the scores of different flights of an aircraft.

Figure 6:
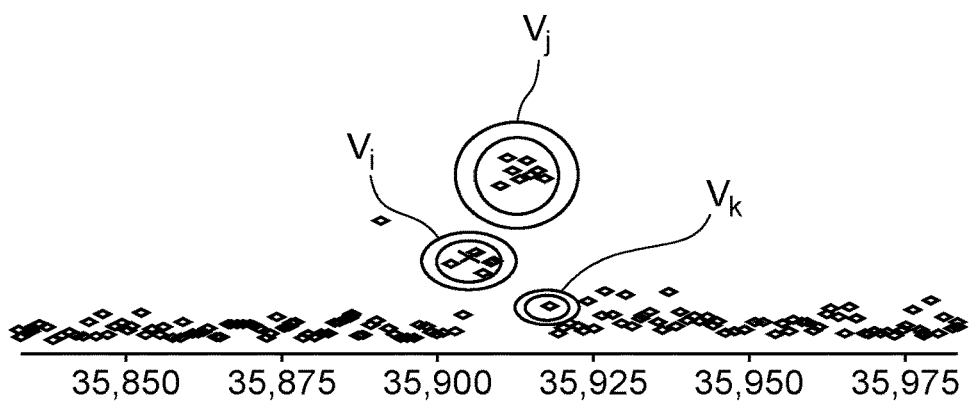
FIG. 6 illustrates a graph representing a set of successive flights of a specific aircraft, according to an embodiment of the disclosure herein.

FIG. 6 illustrates a graph representing a set of successive flights of a specific aircraft, according to an embodiment of the disclosure herein. The y axis represents the value of the score K (or the distance d). This graph identifies the flights Vi, Vj, Vk for which the parameter exhibits an atypical behavior and the actions and dates of maintenance performed during these flights.

Figure 7:
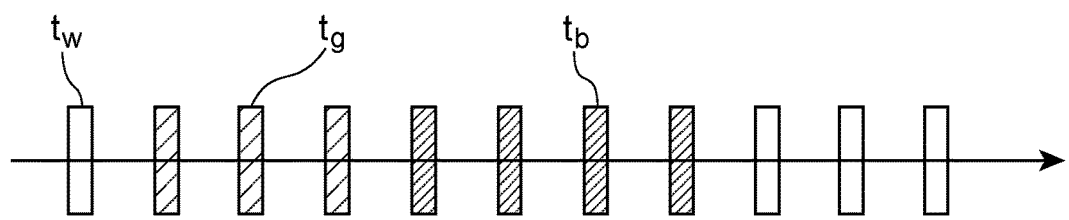
FIG. 7 illustrates the behavior of a specific parameter during a set of successive flights of a specific aircraft between two specific airports, according to another embodiment of the disclosure herein.

FIG. 7 illustrates the behavior of a specific parameter during a set of successive flights of a specific aircraft between two specific airports, according to another embodiment of the disclosure herein.

The successive flights are represented here by lines on a horizontal axis. The light or white line $t_w$ represents a flight during which no atypical behavior was detected. The dark line $t_b$ represents a flight during which an atypical behavior was identified. Finally, the gray line $t_g$ represents a flight during which an atypical behavior was detected but with a low score K compared to the black lines.

These light $t_w$, gray $t_g$ and dark $t_b$ lines define reliable markers of the state of degradation of a system of the aircraft associated with the specific parameter. In particular, the gray line $t_g$ can be considered as a precursor of a degradation. Furthermore, by consulting the maintenance history, it is possible to identify the maintenance actions which have produced the best repairs thus facilitating the task of the maintenance operators for any new search for failures.

Figure 8:
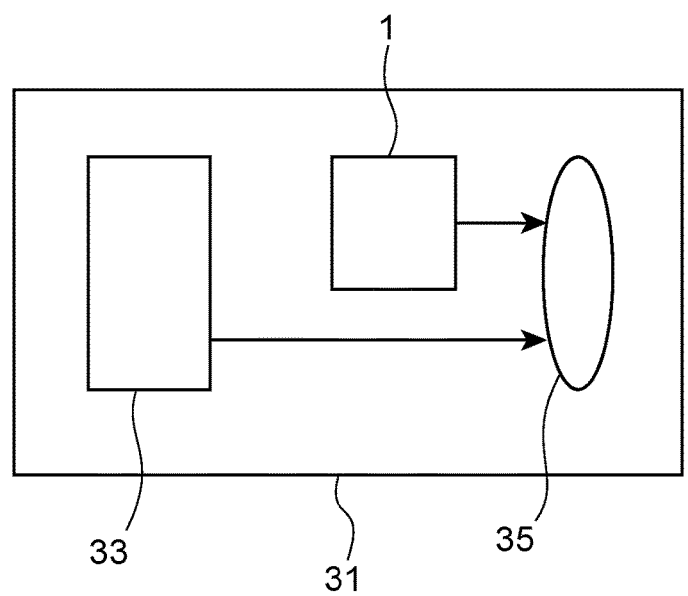
FIG. 8 illustrates a monitoring system comprising the system for predicting failures, according to an embodiment of the disclosure herein.

FIG. 8 illustrates a monitoring system comprising the system for predicting failures according to an embodiment of the disclosure herein.

The monitoring system 31 comprises the system for predicting failures 1 and existing maintenance and management avionics systems 33 comprising a flight scheduling system, a maintenance information system, a trouble shooting manual TSM, an aircraft maintenance manual AMM, and a minimum equipment list MEL. This monitoring system 31 combines the information generated by the system for predicting failure with those from the maintenance and management avionics systems. This combination of information 35 allows the maintenance engineers to identify the flight plans of a specific aircraft on which an atypical behavior has been detected enabling them to take the correct action at the right time in order to minimize interruption of service of the flights.

For example, in the case of a detection of an atypical behavior, an aircraft may be subject to an MEL after the next two flights. The maintenance operators thus have two flights to be able to perform anticipatory maintenance actions or to select the most suitable maintenance center while ordering the appropriate equipment. An accurate scheduling of the maintenance can then be done thus optimizing the management of the return of the aircraft to service.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for predicting failures in an aircraft, the method comprising analyzing a current behavior of at least one flight parameter of the aircraft to detect any deviation of the current behavior relative to a preconstructed behavior model of the flight parameter, the behavior model being constructed in a preliminary learning phase from a plurality of series of learning data relating to the flight parameter that have been collected during flights of a set of aircraft, wherein detection of any deviation of the current behavior of the flight parameter relative to the preconstructed behavior model of the flight parameter comprises:
   collecting, on each current flight, a current series of data from measurements relating to the flight parameter;
   segmenting the current series of data into a predetermined number of segments to transform it into a current string of segments, the predetermined number of segments being defined by the preconstructed behavior model;
   aligning the segments of the current string of segments relative to a reference string of segments defined by the preconstructed behavior model;
   assigning predetermined characteristic measurements to the current string of segments to generate a current measurement vector; and
   computing a distance between the current measurement vector and a reference measurement vector defined by the preconstructed behavior model, a value of the distance being representative of a normal or deviant behavior of the flight parameter.

2. The method of claim 1, further comprising computing a score of abnormal behavior of the flight parameter.

3. The method of claim 2, further comprising identifying a set of flights of the aircraft exhibiting a deviant behavior and of maintenance actions performed during the set of flights.

4. The method of claim 1, further comprising identifying a set of flights of the aircraft exhibiting a deviant behavior and of maintenance actions performed during the set of flights.

5. The method of claim 1, wherein each series of learning data or current series of data comprises temporal data from a flight data recorder and/or temporally indexed failure messages from a centralized supervision system.

6. The method of claim 1, wherein construction of the behavior model relating to a given flight parameter comprises:
   collecting, on each of the flights of the set of the aircraft, at least one series of learning data from measurements relating to the flight parameter thus forming, during the flights of the set of the aircraft, the plurality of series of learning data;
   segmenting each series of learning data into an optimal number of segments to transform it into a string of learning segments, the optimal number of segments defining the predetermined number of segments associated with the flight parameter;
   transforming the set of series of learning data into a corresponding set of strings of learning segments;
   selecting a central string of segments from the set of strings of learning segments, the central string of segments defining the reference string of segments;
   aligning the segments of the set of strings of learning segments by being identified relative to the reference string of segments;
   generating a learning measurement vector for each string of learning segments by assigning predetermined characteristic measurements to each learning segment and/or to the set of segments of each string of learning segments;
   computing a learning distance between each learning measurement vector and a reference measurement vector associated with the reference string of segments; and
   partitioning the set of the learning measurement vectors according to consecutive intervals as a function of the learning distances thus defining a normal behavior interval and atypical behavior intervals.

7. The method of claim 6, wherein the central string of segments corresponds to the medoid of the set of strings of segments, the method comprising:
   saving the reference string of segments, the distances between the measurement vectors and the reference measurement vector, and the partitioning of the measurement vectors; and
   displaying a graph representative of the behavior model.

8. The method of claim 1, comprising displaying a result illustrating a behavior deviation of one or more flight parameters.

9. The method of claim 6, further comprising:
   saving the reference string of segments, the distances between the measurement vectors and the reference measurement vector, and the partitioning of the measurement vectors; and
   displaying a graph representative of the behavior model.

10. A system for predicting failures in an aircraft, comprising a processor configured to analyze a current behavior of at least one flight parameter of the aircraft to detect any deviation of the current behavior relative to a predetermined behavior model of the flight parameter, the behavior model being determined from a plurality of series of learning data relating to the flight parameter collected during flights of a set of aircraft and detection of any deviation of behavior of a flight parameter comprising:
   collecting, on each current flight, a current series of data from measurements relating to the flight parameter;
   segmenting the current series of data into a predetermined number of segments to transform it into a current string of segments, the number of segments being defined by the behavior model;
   aligning the segments of the current string of segments relative to a reference string of segments defined by the behavior model;
   assigning predetermined characteristic measurements to the current string of segments to generate a current measurement vector; and
   computing a distance between the current measurement vector and a reference measurement vector defined by the behavior model, a value of the distance being representative of a normal or deviant behavior of the flight parameter.

11. A monitoring system comprising maintenance and management avionics systems, and further comprising the system for predicting failures of claim 10.

12. The system of claim 10, wherein the system is configured to compute a score of abnormal behavior of the flight parameter.

13. The system of claim 12, wherein the system is configured to identify a set of flights of the aircraft exhibiting a deviant behavior and of maintenance actions performed during the set of flights.

14. The system of claim 10, wherein the system is configured to identify a set of flights of the aircraft exhibiting a deviant behavior and of maintenance actions performed during the set of flights.

15. The system of claim 10, wherein each series of learning data or current series of data comprises temporal data from a flight data recorder and/or temporally indexed failure messages from a centralized supervision system.

16. The system of claim 10, wherein construction of the behavior model relating to a given flight parameter comprises:
- collecting, on each of the flights of the set of the aircraft, at least one series of learning data from measurements relating to the flight parameter thus forming, during the flights of the set of the aircraft, the plurality of series of learning data;
- segmenting each series of learning data into an optimal number of segments to transform it into a string of learning segments, the optimal number of segments defining the predetermined number of segments associated with the flight parameter;
- transforming the set of series of learning data into a corresponding set of strings of learning segments;
- selecting a central string of segments from the set of strings of learning segments, the central string of segments defining the reference string of segments;
- aligning the segments of the set of strings of learning segments by being identified relative to the reference string of segments;
- generating a learning measurement vector for each string of learning segments by assigning predetermined characteristic measurements to each learning segment and/or to the set of segments of each string of learning segments;
- computing a learning distance between each learning measurement vector and a reference measurement vector associated with the reference string of segments; and
- partitioning the set of the learning measurement vectors according to consecutive intervals as a function of the learning distances thus defining a normal behavior interval and atypical behavior intervals.

17. The system of claim 16, wherein the central string of segments corresponds to the medoid of the set of strings of segments, and
the system is configured to:
- save the reference string of segments, the distances between the measurement vectors and the reference measurement vector, and the partitioning of the measurement vectors; and
- display a graph representative of the behavior model.

18. The system of claim 17, wherein the system is configured to display a result illustrating a behavior deviation of one or more flight parameters.

19. The system of claim 16, wherein the system is configured to:
- save the reference string of segments, the distances between the measurement vectors and the reference measurement vector, and the partitioning of the measurement vectors; and
- display a graph representative of the behavior model.

* * * * *